US012557957B2

(12) United States Patent
Bora et al.

(10) Patent No.: US 12,557,957 B2

(45) Date of Patent: Feb. 24, 2026

(54) ELECTROSTATIC DISCHARGE MITIGATION OF VACUUM CLEANERS

(71) Applicant: MILWAUKEE ELECTRIC TOOL CORPORATION, Brookfield, WI (US)

(72) Inventors: Sanjay Bora, Germantown, WI (US); Nathan Beining, Milwaukee, WI (US); Anthony R. Sleck, Lisbon, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 258 days.

(21) Appl. No.: 18/127,740

(22) Filed: Mar. 29, 2023

(65) Prior Publication Data

US 2023/0309774 A1 Oct. 5, 2023

Related U.S. Application Data

(60) Provisional application No. 63/338,941, filed on May 6, 2022, provisional application No. 63/326,330, filed on Apr. 1, 2022.

(51) Int. Cl.
*A47L 9/28* (2006.01)
*H05F 3/02* (2006.01)

(52) U.S. Cl.
CPC ........... *A47L 9/2889* (2013.01); *A47L 9/2884* (2013.01); *H05F 3/02* (2013.01)

(58) Field of Classification Search
CPC .... A47L 9/2889; A47L 9/2884; A47L 9/2878; H05F 3/00; H05F 3/02
See application file for complete search history.

(56) References Cited

U.S. PATENT DOCUMENTS 10,945,575 B2 3/2021 Zhou et al.

FOREIGN PATENT DOCUMENTS

| | | | | |
|---|---|---|---|---|
| CN | 106580188 A * | 4/2017 | ............... | A47L 5/24 |
| DE | 10241129 A1 | 12/2003 | | |
| JP | H01259825 A | 10/1989 | | |
| KR | 20020078589 A | 10/2002 | | |
| KR | 100710213 B1 | 4/2007 | | |

OTHER PUBLICATIONS

CN106580188A(machine translation) (Year: 2017).*

* cited by examiner

*Primary Examiner* — Andrew A Horton
(74) *Attorney, Agent, or Firm* — Michael Best & Friedrich LLP

(57) ABSTRACT

A vacuum cleaner including a suction motor assembly having an impeller configured to generate vacuum pressure, a motor driving the impeller, and a motor shroud including a conductive material and at least partially covering the impeller. The vacuum cleaner also includes a battery pack configured to selectively power the motor and having a positive terminal and a negative terminal, a ground wire electrically connecting the motor to the negative terminal of the battery pack, and an electrostatic discharge wire electrically connecting the conductive material of the motor shroud to the ground wire such that electrostatic charge generated on the motor shroud is discharged through the electrostatic discharge wire and dissipated through the negative terminal of the battery pack.

18 Claims, 5 Drawing Sheets

ELECTROSTATIC DISCHARGE MITIGATION OF VACUUM CLEANERS

CROSS-REFERENCE TO RELATED APPLICATIONS

This application claims priority to and claims the benefit of U.S. Provisional Patent Application No. 63/326,330 filed on Apr. 1, 2022 and U.S. Provisional Patent Application No. 63/338,941 filed on May 6, 2022, the contents of which are hereby incorporated by reference in their entirety.

FIELD OF THE INVENTION

The present disclosure relates to vacuum cleaners, and more particularly to vacuum cleaners having electrostatic discharge mitigation capabilities.

SUMMARY

In one embodiment, the invention provides a vacuum cleaner. The vacuum cleaner includes a suction motor assembly having an impeller configured to generate vacuum pressure, a motor driving the impeller, and a motor shroud including a conductive material and at least partially covering the impeller. The vacuum cleaner also includes a battery pack configured to selectively power the motor and having a positive terminal and a negative terminal, a ground wire electrically connecting the motor to the negative terminal of the battery pack, and an electrostatic discharge wire electrically connecting the conductive material of the motor shroud to the ground wire such that electrostatic charge generated on the motor shroud is discharged to the electrostatic discharge wire and is dissipated through the negative terminal of the battery pack.

In another embodiment, the invention provides a vacuum cleaner. The vacuum cleaner includes a suction motor assembly having an impeller configured to generate vacuum pressure, a motor driving the impeller, and a motor shroud being formed from metal and covering radial sides of the impeller such that the impeller is circumferentially covered. The vacuum cleaner also includes a battery pack and an electrostatic discharge conductor. The battery pack is configured to selectively power the motor and has a positive terminal and a negative terminal. The electrostatic discharge conductor electrically couples the metal of the motor shroud to the negative terminal of the battery pack such that electrostatic charge generated on the motor shroud is discharged through the electrostatic discharge conductor and is dissipated through the negative terminal of the battery pack.

In yet another embodiment, the invention provides a vacuum cleaner including a tank configured to capture debris and a power head coupled to the tank. The power head includes a suction inlet through which a suction airflow is generated, an outlet configured to exhaust the suction airflow, and a suction motor assembly. The suction motor assembly has an impeller configured to generate the suction airflow, a motor driving the impeller, and a motor shroud including a conductive material and at least partially covering the impeller. The power head also includes a battery pack and an electrostatic discharge conductor. The battery pack is configured to selectively power the motor and has a positive terminal and a negative terminal. The electrostatic discharge conductor electrically connects the conductive material of the motor shroud to the negative terminal of the battery pack such that electrostatic charge generated on the motor shroud is dissipated through the negative terminal of the battery pack.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
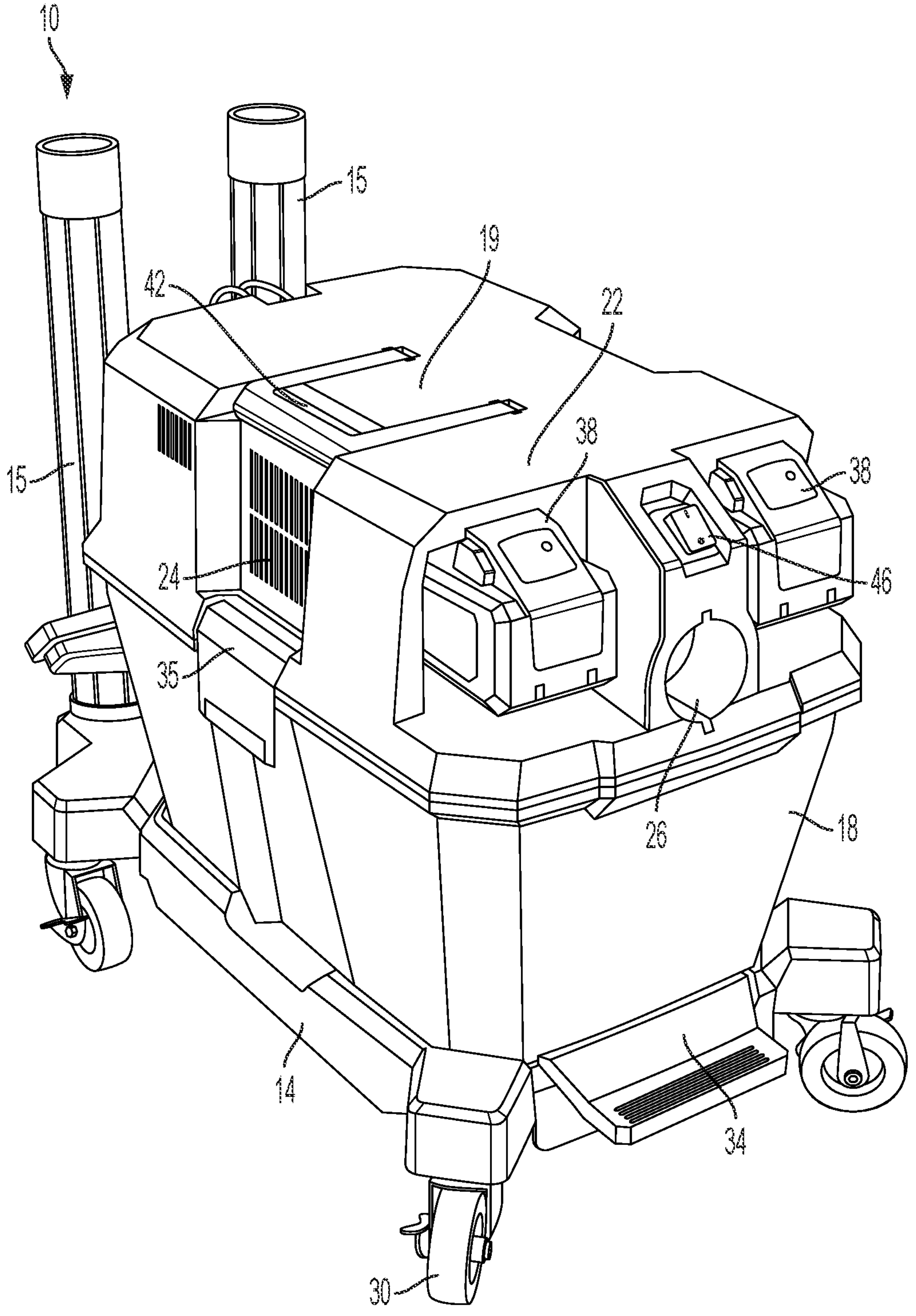
FIG. 1 is a perspective view of a vacuum cleaner assembly.
Figure 2:
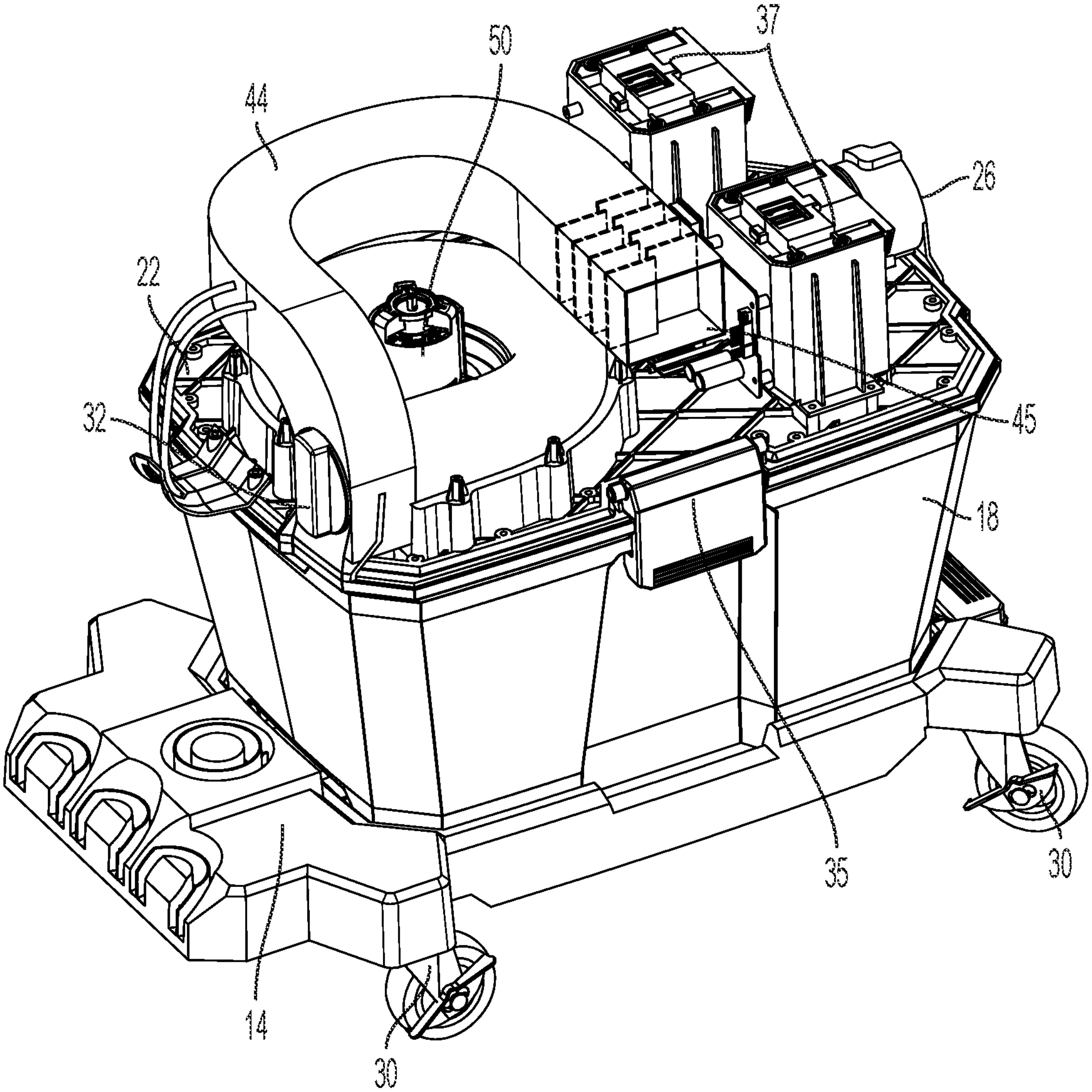
FIG. 2 is a perspective view of the vacuum cleaner assembly of FIG. 1 with a power head housing removed.

FIGS. 1 and 2 illustrate a vacuum cleaner assembly 10 including a stand 14, a tank 18, and a power head 22 detachably coupled to the upper end of the tank 18. The vacuum cleaner 10 (e.g., the head 22) includes a hose inlet 26 through which debris and clean air pass through during operation of the vacuum cleaner 10. The power head 22 further includes a suction motor assembly 50 which generates a working airflow within the vacuum cleaner 10, an exhaust vent 24 configured to exhaust the working airflow, and a blower outlet 31 (FIG. 3) configured to selectively exhaust the suction airflow. The exhaust vent 24 discharges the clean air that has been filtered by the vacuum cleaner 10. The hose inlet 26 is a suction inlet, and the suction airflow is generated through the hose inlet 26. A hose assembly (not shown) is attached to the hose inlet 26 such that the suction airflow is generated through the hose assembly. The hose assembly includes hose ends and a hose. The hose may be a flexible tube in some embodiments. The hose ends are coupled to the hose. One hose end may be coupled to the hose inlet 26 of the vacuum assembly 10. The opposite hose end may function as an inlet of the vacuum cleaner assembly 10. Additionally, or alternatively, the opposite hose end may be attached to an attachment (e.g., an vacuum accessory tool), and the attachment may function as an inlet of the vacuum cleaner assembly 10. Additionally or alternatively, the hose may be attached to the blower outlet 31 of the vacuum cleaner 10 such that the vacuum cleaner may function as a blower. In the illustrated embodiment, the blower outlet 31 may be covered with a cap 32.

The tank 18 functions as a collector to capture debris captured by the vacuum cleaner 10. The stand 14 is mounted upon caster wheels 30 for moving the vacuum cleaner assembly 10. The stand 14 includes accessory retention features configured to receive accessories 15 for storage and transport with the stand 14. The stand 14 further includes a foot pedal 34 opposite the accessory retention features. Other positions for foot pedals are possible. The user may push the foot pedal 34 to actuate a latch allowing the tank 18 to be removed from the stand 14. Additionally, the power head 22 may be removed from the tank 18 to empty the debris (e.g., solid, granular, and/or fluid debris) from the tank 18. The power head 22 is releasably coupled to the tank 18 with two over-center latches 35 positioned on opposite sides of the power head 22.

The power head 22 further includes battery boxes 37, each configured to receive a battery pack 38. In some exemplary embodiments, the battery packs 38 may be, for example, 18V battery packs. In some other exemplary embodiments, the battery packs 38 may be replaced with 36V battery packs. In some other embodiments, the power head 22 may only include a single battery box and battery. In some other embodiments, the power head may include more than two battery boxes and batteries. Each of the battery packs 38 includes a positive terminal and a negative terminal. The battery packs 38 may be connected in series or in parallel.

The head 22 further includes a handle 42. The illustrated handle 42 is pivotable relative to the head. Accordingly, the handle 42 extends from the head 22 when a user grasps the handle 42, and the handle 42 is retained within the boundaries defined by the head 22 when the user releases the handle 42. The head 22 further includes a power switch 46 configured to selectively operate the vacuum cleaner 10.

Figure 3:
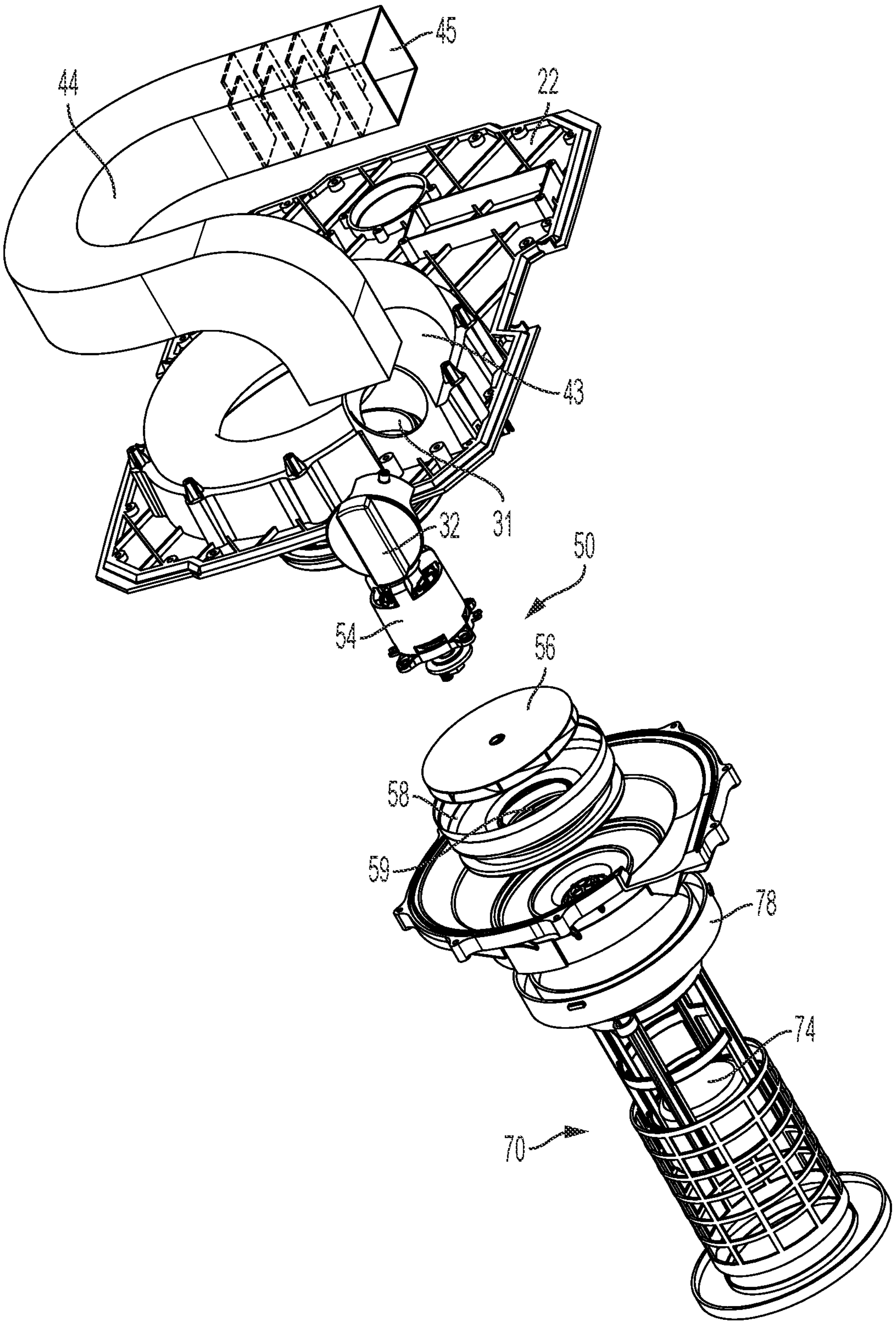
FIG. 3 is an exploded view of a power head of the vacuum cleaner assembly of FIG. 1.

Referring now to FIGS. 2 and 3, the power head 18 further includes a diffuser 43 and a duct 44. The duct 44 is fluidly connected to the diffuser 43 and the blower outlet 31 for exhausting the suction airflow. The duct 44 includes an outlet 45 for exhausting the suction airflow. The outlet 45 of the duct 44 aligns with the exhaust vent 24 of the power head 18. The cap 32 may be removably coupled to the blower outlet 31. When the cap 32 is coupled to or covers the blower outlet 31, the suction airflow bypasses the blower outlet 31 and flows through the duct 44 and out of the outlet 45 and the exhaust vent 24. When the cap 32 is removed from the blower outlet 31, the suction airflow exhausts through the blower outlet 31 and through the outlet 45. The diffuser 30, the duct 44 and the suction motor assembly 50 are positioned in a power head housing 19.

The power head 22 includes the suction motor assembly 50 which configured to generate vacuum pressure in the form of the suction air flow and includes a filter assembly 70 which is coupled to the suction motor assembly 50. The filter assembly 70 extends into the tank 18. The filter assembly 70 includes a filter removably mounted over a float cage 78. A float 74 is movably retained within the float cage 78 such that the float can move with the surface of liquid recovered in the tank to close the path to the suction motor if the liquid level exceeds a maximum height. The suction airflow and debris generated by the suction motor assembly 50 is received in the tank 18 through the suction inlet 26 and is sucked through the filter assembly 70. In some embodiments, the vacuum cleaner 10 may be used to pull a debris laden suction airflow in through the inlet 30 and deposit debris separated from the suction airflow into the tank 18. Some debris that is not separated from the suction airflow and deposited into the tank 18 may be caught by the filter.

Figure 4:
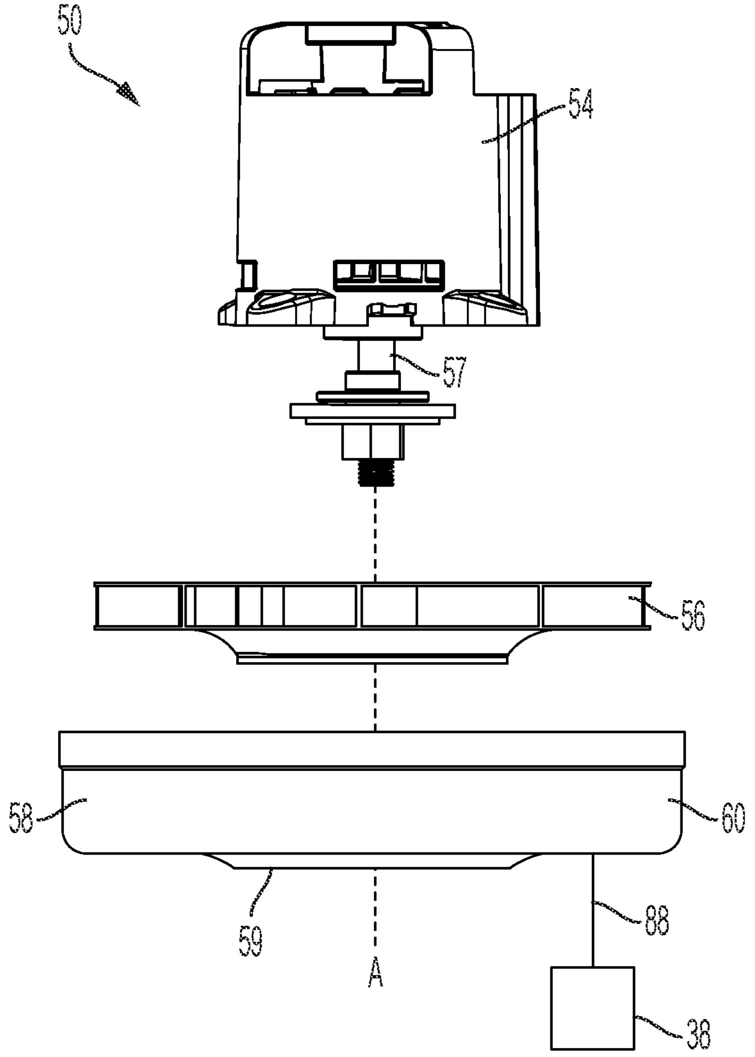
FIG. 4 is an exploded view of a suction motor assembly of the power head of FIG. 3.

With reference to FIGS. 3 and 4, the vacuum pressure generated by the suction motor assembly 50 sucks debris (e.g., solid, granular, and/or fluid debris) through the hose inlet 26 (e.g., the "inlet"). The suction motor assembly 50 is powered by the battery packs 38. The suction motor assembly 50 includes a motor 54 driving an impeller 56. The impeller 56 is coupled to an output shaft 57 of the motor 54 such that rotation of the output shaft 57 corresponds to rotation of the impeller 56. The impeller 56 extends and rotates around a rotational axis A. The rotational axis A is colinear with the rotational axis of the output shaft 57. When the motor 54 is switched on, the impeller 56 generates the suction in the vacuum assembly 10. In the illustrated embodiment, the motor 54 is a 36V brushless motor. The motor 54 is selectively powered by the battery packs 38. A variety of different motors may also be used.

The impeller 56 is covered by a motor shroud 58, or motor cover. The impeller 56 is positioned in the motor shroud 58. The motor shroud 58 includes a circumferential wall 60 circumferentially surrounding the impeller 56 and positioned radially outward from the impeller 56 relative to the rotational axis A. The circumferential wall 60 has a larger diameter than the impeller 56 and is centered on the rotational axis A. In other words, the circumferential wall 56 is concentric with the impeller 56. The motor shroud 58 covers the upstream face of the impeller 56 (except for a centrally-located inlet port 59) and covers the radial sides of the impeller 56 to circumferentially cover the impeller 56. The motor shroud 58 may include outlet vents on the circumferential wall to allow the airflow generated by the rotating impeller to exhaust from the motor shroud 58. In the illustrated embodiment, the motor shroud 58 is formed from stamped metal. In other embodiments, the motor shroud 58 may be formed from any conductive or metallic material. In other embodiments, the motor shroud 58 may be plated with a conductive or metallic material. When the suction motor assembly 50 is in operation, an electrostatic charge is generated in the motor shroud 58. In other embodiments, only the circumferential wall 60 of the motor shroud 58 is formed from conductive or metallic material. In other embodiments, only the circumferential wall 60 is plated with a conductive or metallic material.

Upon operation of the suction motor assembly 50, debris and dirty air are sucked through the vacuum cleaner assembly 10. With contact between the debris and/or dirty air and components of the vacuum cleaner, and particularly the motor assembly 50, a difference between a charge affinity component and the debris and/or dirty air induces an electrostatic charge within the vacuum cleaner assembly 10. One consideration of the current invention is to dissipate the electrostatic charge generated by a difference in charge affinity between the components of the motor assembly 50 and debris. Thus, the amount of induced electrostatic charge within the vacuum cleaner assembly 10 can be dissipated and the intensity and frequency of electrostatic discharge to the user or the electronics of the vacuum cleaner assembly 10 can be mitigated.

Figure 5:
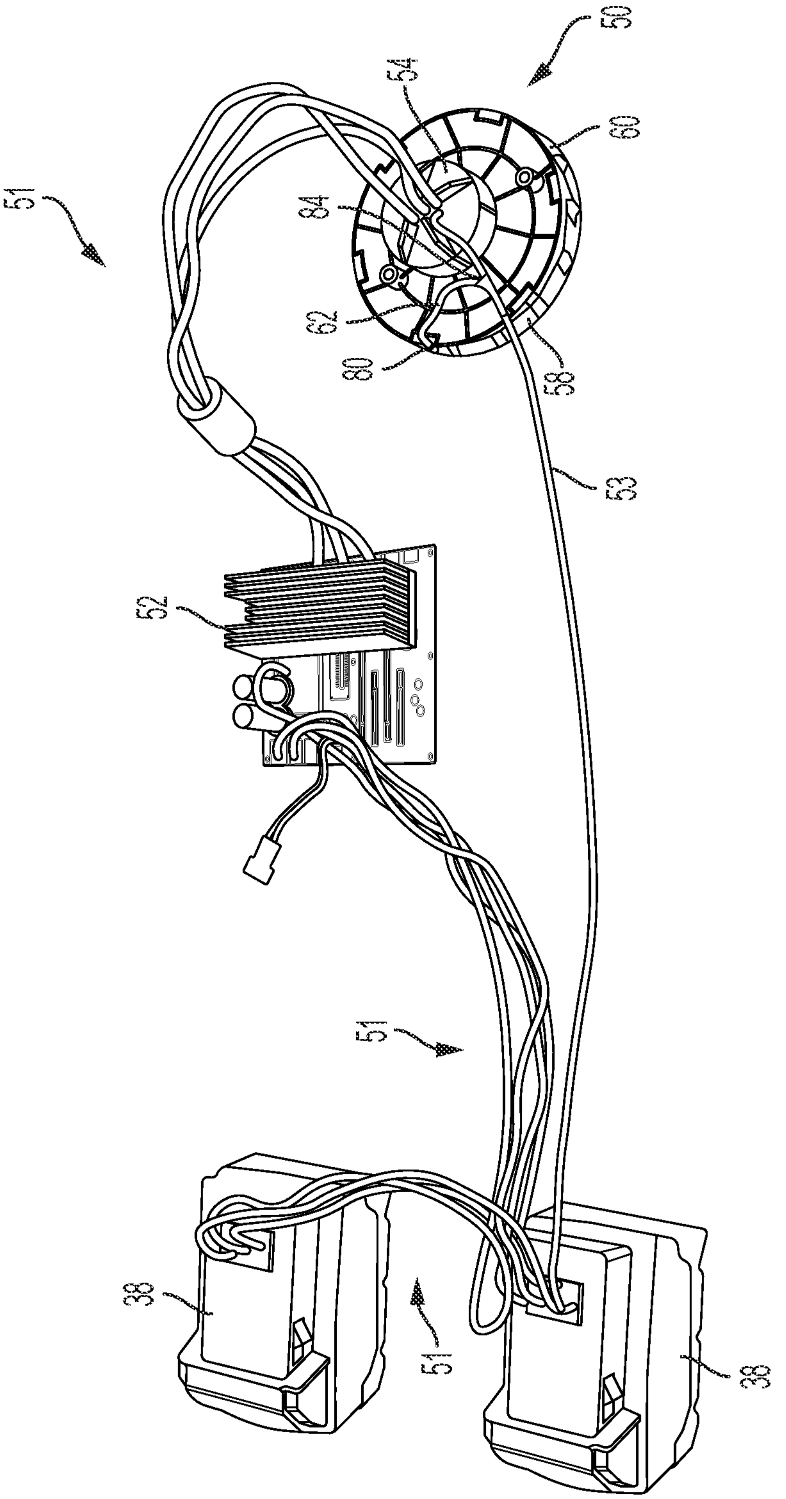
FIG. 5 is a perspective view of an electrical parts assembly of the vacuum cleaner assembly of FIG. 1.

With reference to FIG. 5, an electrical parts assembly includes the battery packs 38, the suction motor assembly 50 and a printed circuit board (PCB) 52 electrically coupled to the battery packs 38 and the suction motor assembly 50 via a plurality of wires and/or cables 51. A ground wire 53 extends from the suction motor assembly 50 back to the negative terminal of one of the battery packs 38. Specifically, the ground wire 53 connects to an electrical connector housed within the battery box 37, wherein that electrical connector connects to the negative terminal of the battery pack 38 when the battery pack 38 is mounted within the battery box 37. The PCB 52 is additionally electrically connected to the power switch 46 and is connected the suction motor assembly 50 to power the suction motor assembly 50 when the power switch 46 is engaged. The switch 46 may be coupled to the PCB 52 via a wired connection or wireless connection. Specifically, the PCB 52 energizes the motor 54 in response to the switch 46 being placed in an ON position and deenergizes the motor 54 in response to the switch 46 being placed in an OFF position. The battery packs 38 supply power to the suction motor assembly 50.

As illustrated in FIG. 5, the electrical parts assembly includes an electrostatic discharge (ESD) conductor. Specifically, the electrical parts assembly includes an electrostatic discharge (ESD) wire 62. In other embodiments, the ESD wire 62 can be replaced with another electrostatic discharge conductor, such as a conductor track, a rail or a cable. In the illustrated embodiment, the electrostatic discharge wire 62 extends from the motor shroud 58 to the ground wire 53, which connects the motor 54 to the negative battery terminal. Specifically, the ESD wire 62 can be coupled to the circumferential wall 60 of the motor shroud 58. In this manner, this electrostatic mitigation solution makes use of the existing ground wire 53 to connect the ESD wire 62 and the motor shroud 58 back to the negative battery terminal. In other embodiments, the ESD wire 62 can extend directly to the negative terminal of the one of the battery packs 38. Specifically, the ESD wire 62 connects to the electrical connector housed within the battery box 37 that connects to the negative terminal of the battery pack 38 when the battery pack 38 is mounted within the battery box 37. In such embodiments, the ESD wire 62 is physically spaced and separated from the ground wire 53. The electrostatic charge that is built up in the motor shroud 58 is accordingly discharged through the ESD wire and is dissipated through the negative terminal of the one of the battery packs 38. Accordingly, risk of shock to a user or failure of the vacuum assembly 10 is reduced and the electrostatic interference (EMI) performance is improved. In the illustrated embodiment, the ESD wire 62 is electrically coupled to the motor shroud 58 via a ring clamp connection. In other embodiments, the ESD wire 62 can be electrically coupled to the motor shroud 58 in other ways such as soldering or crimping and can be electrically coupled via different connectors such as conductive clamps, screw terminals, spade terminals, blade connector.

The electrostatic discharge wire 62 has a first end 80 directly coupled to the motor shroud 58 and a second end 84 opposite the first end 80. The electrostatic discharge wire is continuous from the first end 80 to the second end 84. In the illustrated embodiment, the second end 84 is directly coupled to the ground wire 53. In other embodiments, the second end 84 is directly coupled to the electrical connector in the battery box 37 which connects to the negative terminal of the battery pack 38 when the battery pack 38 is mounted within the battery box 37. The electrostatic charge accordingly is conducted from the first end 80 to the second end 84 and is dissipated through the negative terminal of the one of the battery packs 38. In other words, the electrostatic discharge wire 62 electrically connects the motor shroud 58 to the negative terminal of one of the battery packs 38. The direct couplings may be formed from soldering, crimping or via different connectors such as ring clamp connections, conductive clamps, screw terminals, spade terminals, blade connector. Specifically, the electrostatic discharge wire 62 at least in part forms a conductive path 88 (schematically shown in FIG. 4) from the motor shroud 58 to the negative terminal of one of the battery packs 38.

Although the invention has been described with reference to certain embodiments, variations and modifications exist within the scope and spirit of the invention. For example, features of one embodiment may be used in combination with features of another embodiment. Various features and advantages of the invention are set forth in the following claims.

What is claimed is:

1. A vacuum cleaner comprising:
- a suction motor assembly having an impeller configured to generate vacuum pressure, a motor driving the impeller, and a motor shroud including a conductive material and at least partially covering the impeller;
- a battery pack configured to selectively power the motor and having a positive terminal and a negative terminal;
- a ground wire electrically connecting the motor to the negative terminal of the battery pack; and
- an electrostatic discharge wire electrically connecting the conductive material of the motor shroud to the ground wire such that electrostatic charge generated on the motor shroud is discharged through the electrostatic discharge wire and dissipated through the negative terminal of the battery pack.

2. The vacuum cleaner of claim 1, wherein the electrostatic discharge wire has a first end coupled to the motor shroud and a second end coupled to the ground wire.

3. The vacuum cleaner of claim 1, wherein the conductive material is a stamped metal, and wherein the motor shroud is formed from the stamped metal.

4. The vacuum cleaner of claim 1, wherein the impeller rotates around a rotational axis, wherein the motor shroud includes a circumferential wall circumferentially surrounding the impeller and positioned radially outward from the impeller relative to the rotational axis, and wherein the electrostatic discharge wire is coupled to the circumferential wall.

5. The vacuum cleaner of claim 4, wherein the motor shroud at least partially covers an upstream face of the impeller.

6. The vacuum cleaner of claim 1, wherein the electrostatic discharge wire is electrically connected to the motor shroud via a ring clamp connection.

7. The vacuum cleaner of claim 1, wherein the motor shroud is plated with a conductive material.

8. A vacuum cleaner comprising:
- a suction motor assembly having an impeller configured to generate vacuum pressure, a motor driving the impeller, and a motor shroud being formed from metal and covering radial sides of the impeller such that the impeller is circumferentially covered;
- a battery pack configured to selectively power the motor and having a positive terminal and a negative terminal;
- an electrostatic discharge conductor electrically coupling the metal of the motor shroud to the negative terminal of the battery pack such that electrostatic charge generated on the motor shroud is discharged through the electrostatic discharge conductor and dissipated through the negative terminal of the battery pack; and
- a battery box receiving the battery pack and having an electrical connector which connects to the negative terminal of the battery pack, wherein the electrostatic discharge conductor includes a first end directly coupled to the metal of the motor shroud and a second end opposite the first end and directly coupled to the electrical connector of the battery box.

9. The vacuum cleaner of claim 8, wherein the electrostatic discharge conductor is an electrostatic discharge wire.

10. The vacuum cleaner of claim 8, further comprising a ground wire electrically connecting the motor to the negative terminal of the battery pack, wherein the electrostatic discharge conductor includes a first end directly coupled to the metal of the motor shroud and a second end opposite the first end and directly coupled to the ground wire.

11. The vacuum cleaner of claim 8, wherein the metal of the motor shroud is a stamped metal.

12. The vacuum cleaner of claim 8, wherein the motor shroud at least partially covers an upstream face of the impeller.

13. The vacuum cleaner of claim 8, further comprising a power switch and a printed circuit board electrically coupled to the battery pack and the suction motor assembly via a plurality of wires, wherein the printed circuit board is configured to power the suction motor assembly to generate the vacuum pressure when the power switch is engaged.

14. A vacuum cleaner comprising:

a tank configured to capture debris; and a power head coupled to the tank and including:

a suction inlet through which a suction airflow is generated, an outlet configured to exhaust the suction airflow, a suction motor assembly having an impeller configured to generate the suction airflow, a motor driving the impeller, and a motor shroud including a conductive material and at least partially covering the impeller, a battery pack configured to selectively power the motor and having a positive terminal and a negative terminal, an electrostatic discharge conductor electrically connecting the conductive material of the motor shroud to the negative terminal of the battery pack such that electrostatic charge generated on the motor shroud is dissipated through the negative terminal of the battery pack; and a battery box receiving the battery pack and having an electrical connector which connects to the negative terminal of the battery pack, wherein the electrostatic discharge conductor includes a first end directly coupled to the conductive material of the motor shroud and a second end opposite the first end and directly coupled to the electrical connector of the battery box.

15. The vacuum cleaner of claim 14, wherein the electrostatic discharge conductor is an electrostatic discharge wire.

16. The vacuum cleaner of claim 14, further comprising a ground wire electrically connecting the motor to the negative terminal of the battery pack, wherein the electrostatic discharge conductor includes a first end directly coupled to the conductive material of the motor shroud and a second end opposite the first end and directly coupled to the ground wire.

17. The vacuum cleaner of claim 16, wherein the electrostatic discharge conductor is an electrostatic discharge wire.

18. The vacuum cleaner of claim 17, wherein the motor shroud is formed from stamped metal.

* * * * *